United States Patent Office 3,107,483
Patented Oct. 22, 1963

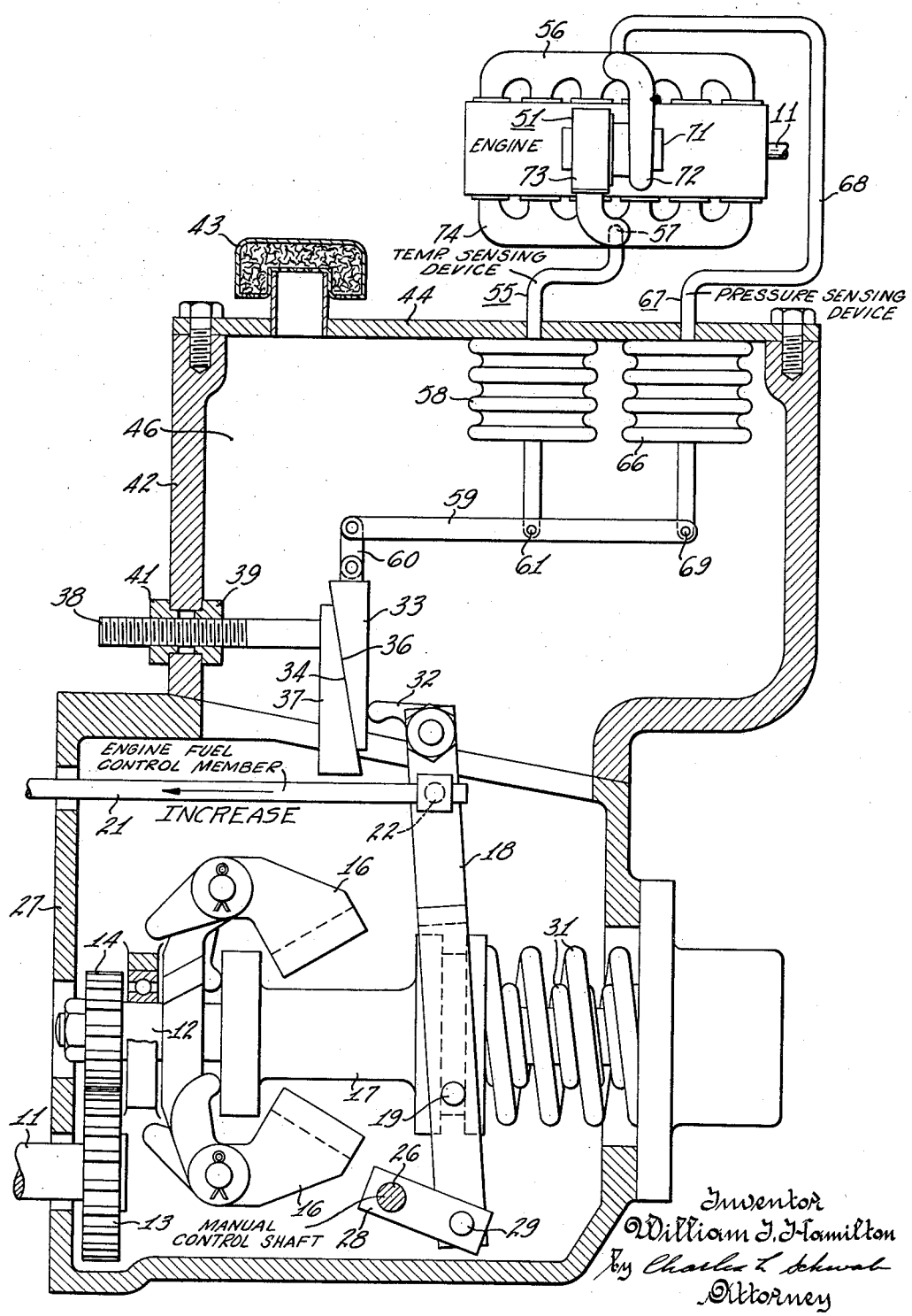

3,107,483
FUEL CONTROL FOR ENGINES
William I. Hamilton, Chicago Heights, Ill., assignor to Allis-Chalmers Manufacturing Company, Milwaukee, Wis.
Filed June 8, 1961, Ser. No. 115,718
4 Claims. (Cl. 60—13)

This invention relates to a fuel control for an internal combustion engine wherein maximum fuel delivery is automatically changed in response to changes of the engine exhaust temperature and intake manifold pressure.

In the exhaust turbocharged diesel engines, one of the limitations on engine output is the turbocharger itself. Exhaust turbochargers are designed for operation at a maximum gas inlet temperature and at a maximum operating speeds, and optimum engine performance is usually obtained when the turbocharger is operating at or near its peak condition. However, in an engine-exhaust turbocharger combination designed for optimum conditions at sea level, overspeeding of the turbine will occur when the engine is operated at altitudes substantially above sea level. The high altitude operation, due to the decrease in the density of the air entering the system, also causes the engine exhaust temperature, which is the turbocharger gas inlet temperature, to rise above the sea level operating temperature condition. This invention automatically compensates for the change in density and prevents damage to the exhaust gas driven turbocharger and engine.

Additionally, when the engine power output is reduced such as at idling, the exhaust turbocharger will slow down and the intake manifold pressure will fall until it approaches atmospheric pressure. When the load is then applied to the engine, full load fuel quantity cannot be injected until the exhaust turbocharger has reached a predetermined speed, without an objectionable and excessive exhaust smoke being created. Heretofore, upon rapid acceleration of an exhaust turbocharged engine from an idling r.p.m., the engine would smoke due to the fact that the exhaust turbocharger has not reached sufficient speed to supply the necessary air for complete combustion of the suddenly increased supply of injected fuel.

It is an object of my invention to provide a fuel control for an exhaust turbocharged diesel engine wherein maximum fuel delivery is automatically controlled in response to changes in exhaust temperature and intake pressure.

It is a further object of this invention to provide an automatically adjustable stop for the fuel control member associated with the governor of a diesel engine wherein the stop is automatically adjusted in response to changes in the temperature of the exhaust gases entering the turbocharger and in response to the pressure of air delivered to the engine by the turbocharger.

These and other objects of this invention will be apparent to those familiar with the art when the following description is read in conjunction with the drawings in which:

The FIGURE is a schematic illustration of my invention incorporated in a diesel engine with parts thereof shown in section.

Referring to the FIGURE, a power takeoff shaft 11 drives governor shaft 12 through gears 13, 14 rotating therewith. Weights 16 are pivotally connected to the governor shaft 12 on axes transverse thereto. As engine r.p.m. increases, the flyweights pivot about their connections to the governor shaft 12 thereby urging the control sleeve 17 to the right in opposition to the governor control spring 31. A control lever 18 has a pivot pin 19 on each of its sides extending into an annular groove in sleeve 17. The upper end of the control lever 18 is pivotally connected to a fuel control member 21 by a pivot connection 22. The fuel control member 21 is connected to the injection pump fuel control rack. A suitable control linkage is employed between the operator's station and control shaft 26 pivotally mounted by means not shown on the governor housing 27. A leg 28 is rigidly secured to shaft 26 and is operatively connected through pivot connection 29 to the bottom end of the control lever 18. Thus the operator can manually control the fuel supply setting of the injection pump control rack.

The upper end of control lever 18 has a finger 32 which is in abutable relation to an adjustable fuel stop in the form of a tapered plate 33. The fuel stop plate 33 has a camming surface 34 in engagement with a complementary camming surface 36 formed on an adjustable abutment 37. Adjustable abutment 37 has a threaded portion 38 on which a pair of lock nuts 39, 41 are screwed to secure the abutment 37 to the upper portion 42 of the governor housing 27. A conventional air breather 43 is mounted on the top 44 of the governor housing so as to place the interior chamber 46 of the governor housing in communication with the atmosphere.

The fuel stop plate 33 is moved up or down to change its position axially of the control rod 21, in response to changes in the temperature of the exhaust gas entering the turbocharger 51, and in response to changes in the pressure of the air delivered by the turbocharger 51 to the intake manifold 56. A temperature sensing device 55 including a sensing element 57 connected to a bellows 58 is used to adjust the fuel stop when the exhaust temperature exceeds a predetermined value. Bellows 58 expands in response to a predetermined exhaust gas temperature sensed by the sensing element 57 thereby moving control link 59 downwardly through the connection of the bellows to the control link by a pivot pin 61. Link 59 is connected to the adjustable fuel stop plate 33 by a toggle link 60 pivotally connected therebetween. Bellows 66 of a pressure sensing device 67 is connected to the intake manifold through a conduit 68 so that when the pressure of the combustion air delivered by the turbocharger 51 falls below a predetermined value, the bellows contract thereby moving the end of link 59 which is pivotally connected to the bellows through the pivot connection 69 and this results in decreasing maximum fuel delivery of the fuel injection pump.

For purposes of explaining the operation of my invention, it may be assumed that the position of the components shown in the FIGURE is normal for a turbocharged engine operating within the temperature and pressure limits for which the engine and turbocharger are designed. If an engine in this adjusted condition is then used at a higher altitude, the exhaust temperature sensed by the sensing element 57 will tend to rise due to the decreased quantity of air supplied and the turbocharger speed will tend to increase due to the decreased density of the ambient air entering the air inlet 71 of the compressor section 72 of the turbocharger 51. The pressure sensing means 67 will tend to retain the position shown and the temperature sensing means 55 will expand thereby moving the link 59 about pivot 69 sliding the fuel stop plate 33 downwardly on the inclined plane defined by the camming surfaces 34, 36, to a decreased fuel supply position.

In this position the maximum fuel setting of the control member 21 has been adjusted to the right thereby reducing the maximum fuel supply quantity. When the exhaust temperature is brought back to acceptable limits the fuel stop will be raised and moved to the left thereby increasing the quantity of fuel that may be injected. By decreasing the maximum engine speed in response to increases in the temperature of the exhaust gases entering the turbine section 73 of the turbocharger 51 from the exhaust manifold 74, damage to the turbocharger and engine are prevented.

Assuming that the engine is slowed down to an idling speed and it is desired to increase engine speed to handle a greater load, the operator will rotate shaft 26 to apply additional fuel. However, the fuel stop 33 will have been shifted downwardly and to the right to limit the amount of fuel that can be supplied to the engine by virtue of the link 59 being pivoted counterclockwise about pivot 61 upon contraction of bellows 66 of the pressure sensing device 67. The bellows 66 is constructed so that it does not contract until the intake manifold pressure drops to a predetermined value. Thus when a load is applied to the engine, full load fuel quantity cannot be injected until the turbocharger has reached a predetermined speed and the intake manifold air pressure is increased by the turbocharger to a predetermined value. This automatic control prevents objectionable and excessive exhaust smoke upon acceleration of the engine.

This invention has particular application in diesel engines used in equipment which is used both at low altitudes and high altitudes, such as highway trucks or construction equipment which is moved from job to job in various parts of the country. By combining the exhaust gas temperature sensing device and the intake manifold pressure sensing device into a single control for the fuel stop 33, I have provided an extremely compact arrangement to automatically guard against excessive turbine temperatures, and excessive smoking. The adjustable stop plate provided herein is sometimes referred to as a smoke stop abutment and it is evident that such an abutment can be adjusted for a particular altitude operation. The temperature sensing element could, of course, be placed at other points in the exhaust gas system, such as at the exhaust gas outlet of the turbocharger.

Although a single embodiment of this invention has been shown, it is not intended to limit the invention except as necessitated by the scope of the appended claims.

What is claimed is:

1. In an internal combustion engine, the combination of a governor responsive to engine speed, a fuel control member associated with the governor and controlling fuel supply to the engine, an exhaust turbocharger for supplying combustion air to the engine, an adjustable stop for said fuel control member, means for adjusting said adjustable stop toward a reduced fuel setting in response to increasing temperature of the exhaust gases entering the turbocharger and means for adjusting said adjustable stop toward a reduced fuel setting in response to decreasing pressure of the air delivered by the turbocharger to the intake manifold of the engine.

2. In an internal combustion engine, the combination of a governor responsive to engine speed, a fuel control member connected to and adjusted by said governor and operative to control the fuel supply to the engine, an exhaust turbocharger for supplying combustion air to the engine, an adjustable stop for said fuel control member, means for adjusting said adjustable stop toward a reduced fuel setting in response to increases in temperature of the engine exhaust gases entering the turbocharger and means for adjusting said adjustable stop toward a reduced fuel setting in response to the pressure of the combustion air delivered by the turbocharger to the engine decreasing to a predetermined value.

3. In an internal combustion engine, the combination of a governor responsive to engine speed, a fuel control member connected to and adjusted by said governor and operative to control the fuel supply to the engine, an exhaust turbocharger for supplying combustion air to the engine, an adjustable stop for said fuel control member, means for adjusting said adjustable stop toward a reduced fuel setting when the temperature of the engine exhaust gases exceeds a predetermined value and means for adjusting said adjustable stop toward a reduced fuel setting in response to the pressure of the combustion air delivered by the turbocharger to the engine decreasing to a predetermined value.

4. In an internal combustion engine having exhaust and intake manifolds, the combination of a governor responsive to engine speed, a fuel control member associated with the governor to control fuel supply to the engine, an exhaust driven turbocharger connected to said exhaust and intake manifolds and supplying combustion air to said engine intake manifold, an adjustable stop for the fuel control member, a link connected to said adjustable stop, a temperature sensing device connected to said link and having a temperature sensing element for sensing the exhaust temperature, said temperature sensing device being operative to adjust said fuel stop to a reduced fuel setting in response to the temperature of the exhaust gases driving the turbocharger increasing to a predetermined maximum value, and a pressure sensing device connected to said intake manifold and said link, said pressure sensing device being operative to adjust said adjustable stop toward a reduced fuel setting in response to the pressure of the air delivered by the turbocharger to the intake manifold decreasing to a predetermined value.

References Cited in the file of this patent

UNITED STATES PATENTS

| | | |
|---|---|---|
| 2,378,037 | Reggio | June 12, 1945 |
| 2,880,580 | Wallace et al. | Apr. 7, 1959 |
| 2,901,885 | Reggio | Sept. 1, 1959 |
| 2,988,872 | Reggio | June 20, 1961 |